United States Patent [19]

Piers

[11] Patent Number: 5,052,220

[45] Date of Patent: Oct. 1, 1991

[54] APPARATUS FOR MEASUREMENTS RELATED TO FLUID FLOW IN A BOREHOLE

[75] Inventor: G. Edward Piers, Houston, Tex.

[73] Assignee: Schlumberger Technology Corporation, Houston, Tex.

[21] Appl. No.: 422,822

[22] Filed: Oct. 17, 1989

[51] Int. Cl.$^5$ ............................................. E21B 47/00
[52] U.S. Cl. ..................................................... 73/155
[58] Field of Search ...................... 73/151, 155, 861.89, 73/861.92; 166/187, 264

[56] References Cited

U.S. PATENT DOCUMENTS

| | | | |
|---|---|---|---|
| 2,451,762 | 10/1948 | Millikan | 166/187 |
| 2,681,706 | 6/1954 | Pottorf | 166/187 |
| 3,066,739 | 12/1962 | Saurenman et al. | |
| 3,942,374 | 3/1976 | Glenn, Jr. | 73/155 |
| 4,452,076 | 6/1984 | Gavignet et al. | |
| 4,460,040 | 7/1984 | Bowyer | |
| 4,460,041 | 7/1984 | Berryman | |
| 4,566,317 | 1/1986 | Shakra | |
| 4,770,212 | 9/1988 | Wienck | |
| 4,800,752 | 1/1989 | Piers | |

FOREIGN PATENT DOCUMENTS 160326 1/1964 U.S.S.R. ................................ 73/155

Primary Examiner—Jerry W. Myracle
Attorney, Agent, or Firm—Henry N. Garrana; John H. Bouchard

[57] ABSTRACT

A logging tool for measuring the fluid flow rate in a well, comprises a measuring pipe provided with a flowmeter, a packer device designed to derive the whole fluid flow into the measuring pipe, and an obstacle disposed in the fluid flow path, at, or downstream of, the exit of the packer for increasing, through the fluid flow action, the pressure of the fluid located upstream of the packer. The obstacle is e.g. a valve responsive to flowing fluid pressure on one side and to a biasing spring on the other side. The packer includes, in its bottom end designed to seal with the casing wall, an anulus seal defining a tubular chamber able to be inflated under the sole fluid action the annulus seal being made by two circumferential parts, facing one another, and fixed along their upper and lower perimeters. The tubular chamber is in communication with the fluid flow and is adapted to expand radially upon the application of fluid pressure while being substantially longitudinally nonextensible.

13 Claims, 3 Drawing Sheets

FIG.1
FIG.2
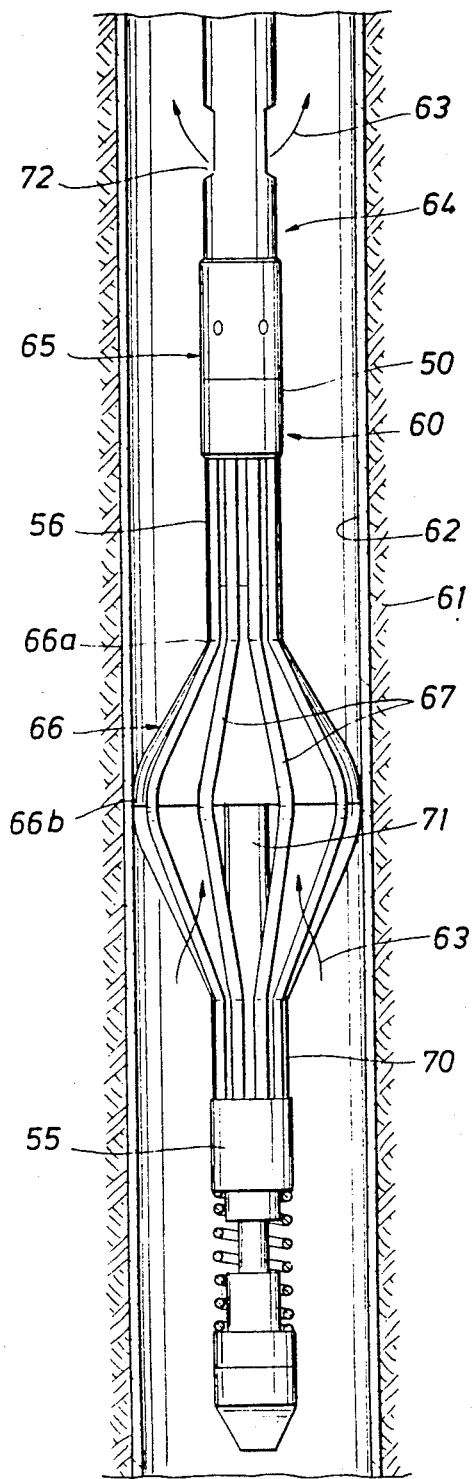
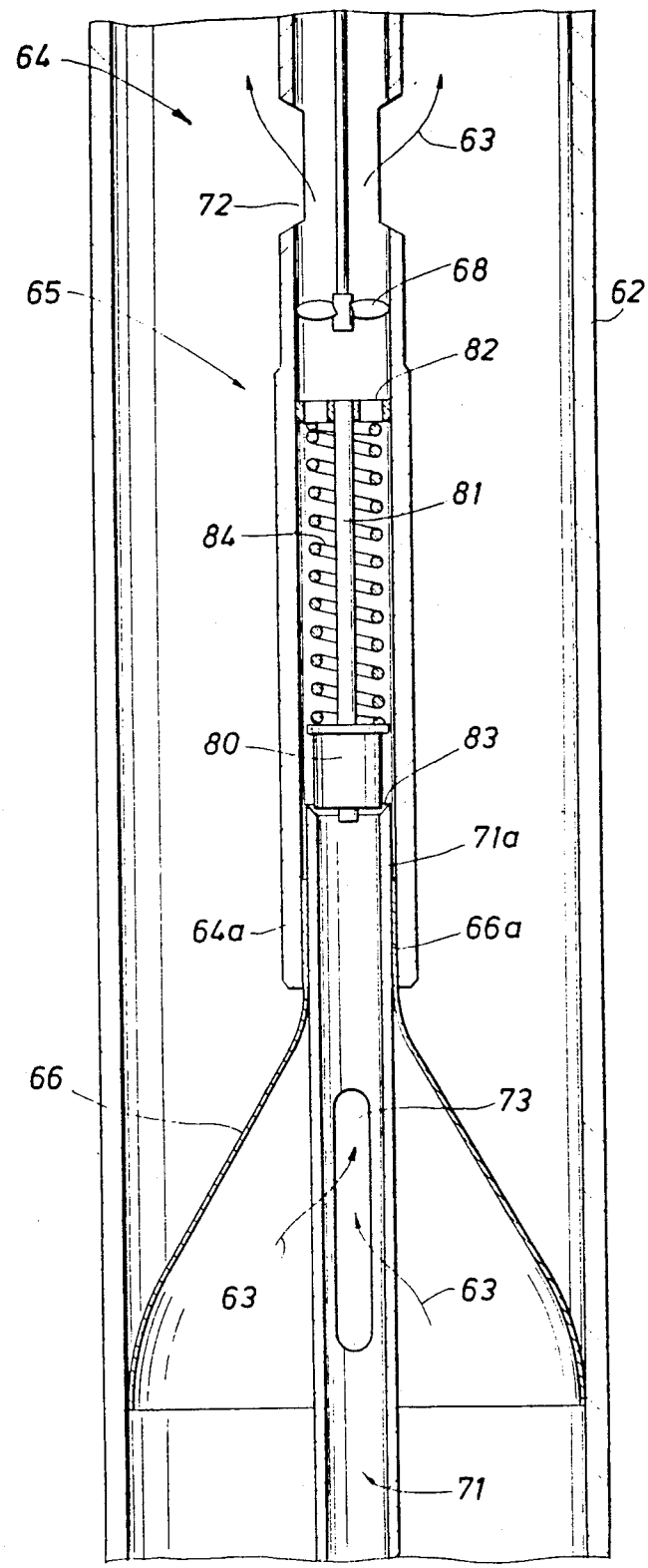

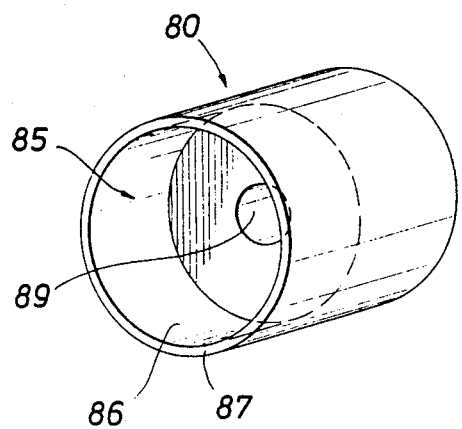
FIG. 3
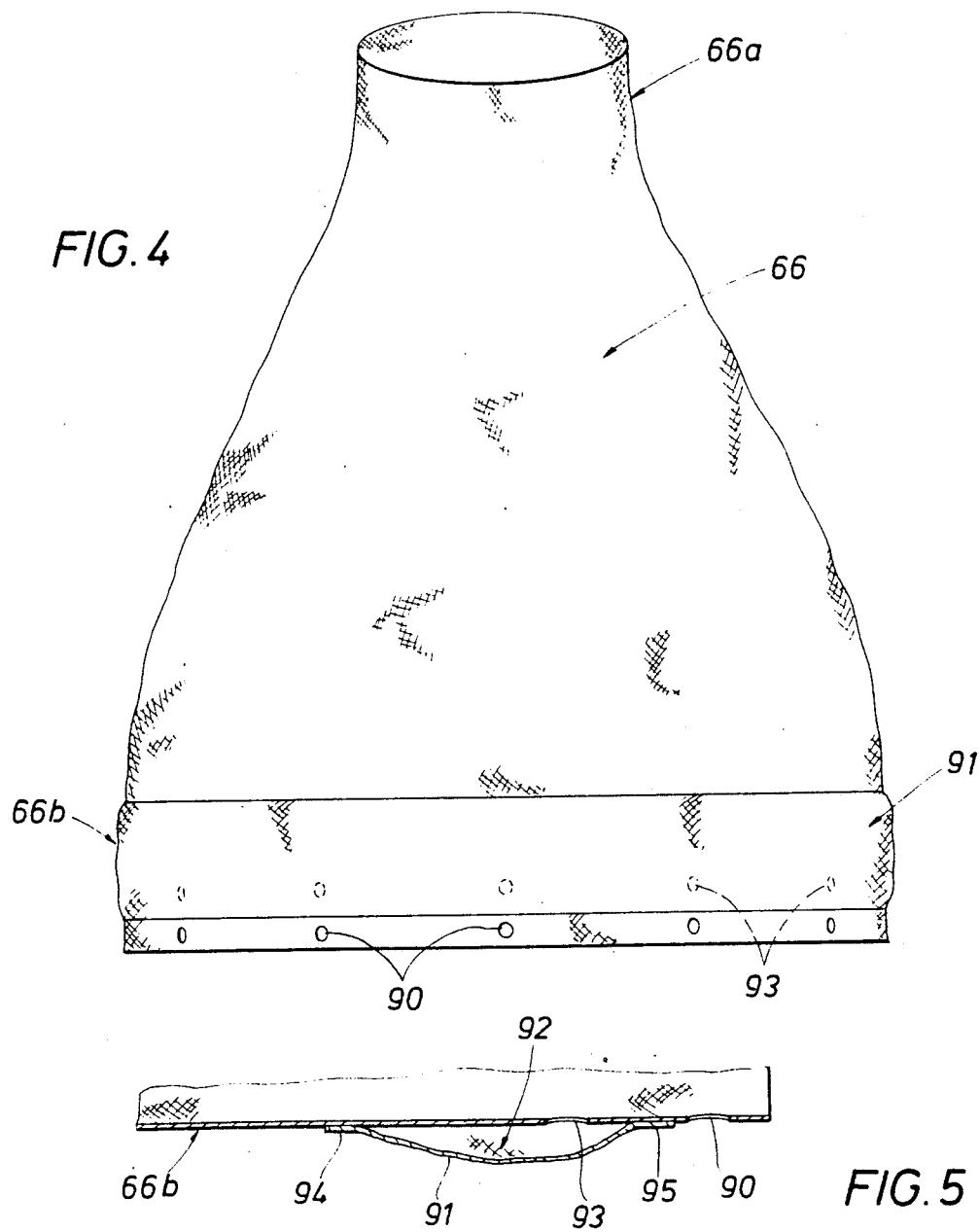
FIG. 4
FIG. 5

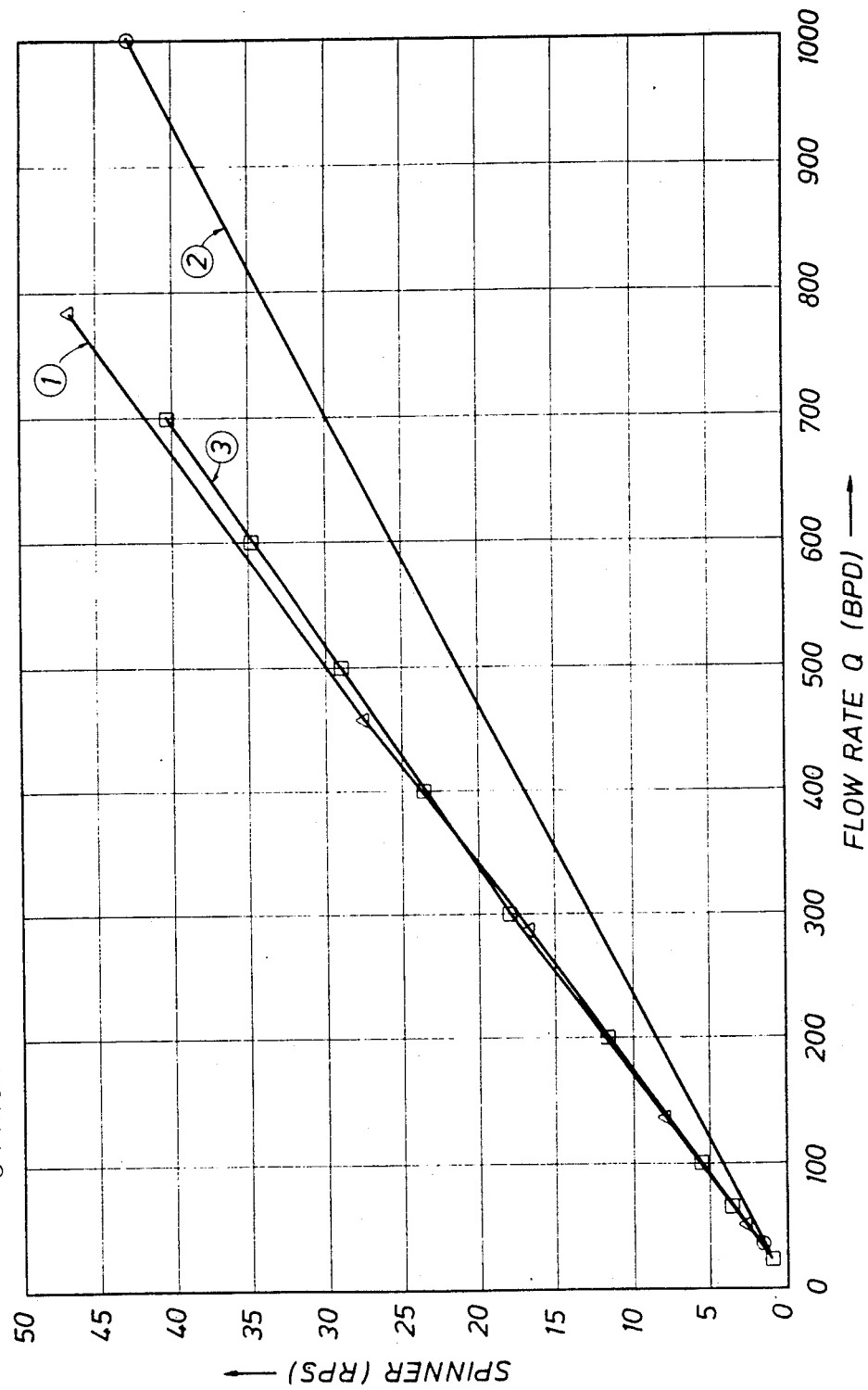

APPARATUS FOR MEASUREMENTS RELATED TO FLUID FLOW IN A BOREHOLE

BACKGROUND OF THE INVENTION

1. Field of the Invention

The present invention relates to a method and an apparatus for use in a borehole having fluid therein, and designed to carry out measurements related to said fluid, such as the flow rate and velocity. More particularly, the invention pertains to the kind of logging tool called "packer flowmeter", wherein the fluid is diverted into a measuring pipe including a flowmeter device which is of reduced cross section with respect to the casing.

2. Description of the Related Art

As known in the art of logging techniques, a well which has been determined to be promising for oil production, is provided with a metallic casing, and cement is injected between the earth formation and the casing. Perforations are then made through the casing/cement and in the oil productive formation, so as to allow oil to flow up to the surface through a tubing beforehand arranged in the well coaxially to the casing. Among other information useful to the user, is the amount of oil produced. The invention may also be used, besides the production wells hereabove referred to, in the so-called "injection wells" in which a high pressure fluid is injected in a first well so as to make the oil move in earth formation towards a neighboring second well which will become the oil producing well.

With respect to the two above mentioned well categories, there have been developed over the years different logging tools and techniques for measuring among others, fluid flow velocity and/or flow rate. These known tools comprise a body centered in the borehole and including a flowmeter device (such as a spinner). Two families of such tools are currently available. In the first kind, the flow is measured through the full diameter of the borehole wall or casing. In the second kind, called "packer flowmeter" and usually designed for low flow velocities, the flow is diverted into a measuring pipe of reduced diameter by a cone-shaped packer device which is designed to close off the annulus between the outside diameter of the tool and the borehole wall or the casing. Commonly used packers are made, either of an inflated cloth bag disposed inside a cage made of longitudinal metal blades, or of a metal basket. Examples of such known packers are described e.g. in U.S. Pat. Nos. 2,649,710; 2,706,406; 3,176,511; 4,552,076; 4,566,317; or 4,800,752.

It is of importance that all the fluid flowing in the casing be diverted into the measuring pipe, so that the measurement is accurate In other words, the sealing between the casing and the terminal bottom part of the packer is critical.

In this respect, it has been proposed, as shown in U.S. Pat. No. 4,800,752 issued to George Ed. Piers, to provide the packer with an inflatable tube disposed at the bottom end of said packer. Said tube is inflated by pumping fluid therein, and thus forms a ring.

Although the foregoing known packer flowmeters have been operated relatively satisfactorily up to now, they can be improved.

Firstly, with respect to the '752 patent device, the additional inflatable tube requires a pump, which increases the complexity of the tool.

Secondly, in multiphase flow, which is the most common case in an oil productive borehole, the water phase, at the exit of the measuring pipe, because of gravity, separates from the oil phase and falls down in the annulus situated above the packer. Accordingly, the upper side (or downstream side) of the packer is submitted to a higher pressure than the bottom side (or upstream side) of the same. This is detrimental since it may cause the packer to collapse down, at least locally, and thus create a substantial leak in the sealing.

Furthermore, the design of the terminal part of the packer in contact with the casing is critical. Since the packer is attached to the support metal blades by this very terminal part, it has to be strong. However, the sealing requires the terminal part to be as soft as possible in order to match the form of the casing. These two opposite requirements lead to a non satisfactory compromise.

According to the above, there is a need for a logging flowmeter tool provided with a reliable sealing between the packer and the casing.

SUMMARY OF THE INVENTION

It is an object of the invention to provide a method and apparatus for carrying out measurements related to the flow in a borehole, with accuracy, by an improved sealing between the packer and the borehole or casing wall.

The foregoing and other objects are attained in accordance with the invention by a method for carrying out measurements in a borehole related to the fluid therein, by a logging tool including a measuring pipe provided with measuring means, and a packer means designed to derive the whole fluid flow into said measuring pipe, comprising the step of increasing, through the fluid flow action, the pressure of the fluid located substantially upstream of the packer.

More precisely, the method includes providing obstacle means in the path of the flowing fluid, at, or downstream of, the top of the packer.

The invention also contemplates a logging tool for carrying out measurements in a well related to the fluid therein, including a measuring pipe provided with measuring means, a packer means designed to derive the whole fluid flow into said measuring pipe, and means for increasing, through the fluid flow action, the pressure of the fluid located substantially upstream of the packer.

In a preferred embodiment, said means for increasing pressure includes obstacle means disposed in the fluid flow path, at, or downstream of, the end of said packer facing the measuring pipe.

More particularly, the obstacle means comprises a moving element responsive to flowing fluid pressure on one side and to biasing means on the other side Advantageously, said biasing means comprises a compression spring.

Preferably, the moving element is a valve including a valve seat and a valve piston slidably mounted along a fixed longitudinal rod.

According to an advantageous embodiment, the valve piston is hollowed in its portion facing said valve seat.

The invention also contemplates, according to another feature, a logging tool for carrying out measurements in a well related to the fluid therein, comprising a housing including a measuring pipe provided with measuring means, and packer means designed to derive the whole fluid flow into said measuring pipe, wherein said packer means includes, in its bottom end designed to seal with the casing wall, an annulus sealing means able to be inflated under the fluid action.

In a preferred embodiment, the packer means includes a cone-shaped bag, and the inflatable annulus sealing means comprises two circumferential parts, facing one another, and fixed along their upper and lower perimeters so as to define a ring-shaped chamber in communication with the fluid flow and adapted to expand radially upon the application of fluid pressure while being substantially longitudinally non-extensible.

More particularly, the packer bag is made of a flexible but substantially longitudinally non-extensible material, such as cloth, and the annulus sealing means comprises a circumferential piece fixed on the terminal part of the bag by its upper and lower perimeters, and adapted to expand radially upon the application of fluid pressure.

Precisely, said circumferential piece is made of a flexible but substantially longitudinally non-extensible material, and is loosely fixed on the bag for allowing radial expansion.

Preferably, said ring-shaped chamber communicates with the fluid flow inside the cone-shaped packer by apertures provided in the packer.

The characteristics and advantages of the invention will appear better from the description to follow, given by way of a non limiting example, with reference to the appended drawing in which:

BRIEF DESCRIPTION OF THE DRAWINGS

FIG. 1 is a schematic side view of an embodiment of the invention in the form of a logging tool suspended in a well;

FIG. 2 is a diagrammatic cross section, at a larger scale, of a detailed part of an embodiment of the invention;

FIG. 3 is a perspective view of the valve piston;

FIG. 4 is a side view of the cloth bag packer with the annulus sealing section;

FIG. 5 is a partial side view, at greater scale, of the annulus sealing section; and FIG. 6 shows a plot of rotation speeds of the spinner versus flow rates.

DESCRIPTION OF THE PREFERRED EMBODIMENT

In FIG. 1, a well logging tool 60 in accordance with the invention is shown disposed within a borehole 61 which has a conventional well casing 62 disposed on the interior surface of the borehole. Flowing fluids, such as hydrocarbons, are shown by arrows 63in and 63out and pass through the well logging tool 60. The logging tool 60 comprises: a housing 64, a measuring pipe 65 including means for measuring characteristics of the fluid flow, which measuring pipe 65 is located inside the housing 64, means for sealing the casing and for directing the flowing fluid into the housing 64 and more specifically inside the measuring pipe 65. The means for sealing and directing fluid comprises a packer type device in the form of a frusto-conical shaped bag 66 provided with a narrow end 66a attached to the housing and a wide end 66b coming into sealing engagement with the borehole wall. The packer bag 66 is disposed in a cage formed by a set of longitudinal blades 67 which are radially foldable. The blades 67 are fixed at both ends on the housing 64. The bottom ends 70 of the metal blades 67 are fixed on a first ring 55 which is slidably mounted on a central pipe 71. The top ends 56 of the blades 67 are fixed on a second ring 50 secured to said housing 64. The longitudinal displacement of the ring allows the set of packer bag/blades to be either opened out (as shown on FIG. 1) or folded down along the tool (e.g. when the tool is displaced from one measuring station in the borehole to another). Downstream of the measuring pipe 65, the housing 64 comprises apertures 72 for the flow to exit (see arrows 63out) from the measuring pipe 65 into the casing 62.

The means for measuring are known per se and may comprise a flowmeter, such as a spinner, whereby the characteristic to be measured is the flow rate of the fluid. As is conventional in the art, the casing 62 has a plurality of perforations (not shown) disposed about its circumference and along its length, through which flowing formation fluids pass from the borehole 61 into casing 62.

More details concerning the general arrangement of the tool can be found in U.S. Pat. No. 4,452,076, and U.S. Pat. No. 4,800,752, both assigned to Schlumberger Technology Corporation, and which are incorporated herein by reference.

As a matter of general interest, "downstream" and "upstream" refer to the fluid flow which is ascendant in the substantially vertical borehole Furthermore, "bottom" and "lower" on the one part, and "upper" and "top" on the other part, are indicative of a respective location referred to with respect to the substantially vertical direction in the borehole. Finally, "longitudinally" refers to the axial direction of the borehole, and "radially" refers to the direction transverse to the borehole axis.

FIG. 2 is an enlarged partial cross-sectional view of the tool of FIG. 1. For the sake of clarity, the metal blades 67 have not been represented. The central pipe 71 comprises, in the section located inside the cloth bag packer 66, holes 73 allowing the fluid (see arrows 63in) to flow inside central pipe 71 which is aligned and in fluid communication with the measuring pipe 65. A measuring device such as a spinner 68, which is well known in the art, is disposed inside said measuring pipe 65. Holes 72 are provided downstream of the spinner 68 in the housing 64 to allow the fluid to exit from the measuring pipe 65, as indicated by the arrows 63out. The narrow end 66a of the packer 66 is substantially circumferential and is secured on the upper end 71a of the central pipe 71. The end 64a of the housing 64 is in turn engaged with said upper end 71a of the central pipe 71.

In the path of the fluid flow, at the exit of the packer bag 66, is provided an obstacle in the form of a valve designed to increase, in a controlled way, the pressure inside the packer bag 66 with respect to the pressure outside the packer, i.e. the pressure of the fluid located above the packer. The valve is disposed at the level of the top of the packer bag 66, and downstream of the measuring pipe 65. The valve includes a valve piston 80, substantially circumferential and slidably mounted on a longitudinal rod 81. Said rod 81 is fixed and centered inside the measuring pipe 65 by a hub 82. Said hub 82 is fixedly attached to the wall of the measuring pipe 65 and is designed to allow the fluid to flow therethrough. The valve piston 80 has such a shape and dimensions that it is able to cooperate with a valve seat 83 formed at the upper end 71a of the central pipe 71. The piston 80, when bearing against the valve seat 83 closes the fluid path. The valve seat 83 may be for instance formed by the edge of the central pipe end 71a. Said edge of the piston may be bevelled towards the inside. The piston 80 is submitted on its upstream end to the fluid pressure in central pipe 71, and on its downstream end to a biasing force from a compression spring 84, coaxially mounted with respect to the rod 81. The spring 84 bears by its upper end (opposite to the piston) against the hub 82.

By way of example and for illustrating the invention, the internal diameter of the measuring pipe 65 may be of 1.3 inch (about 3.5 centimeters) and the diameter of the valve piston 80 may be around 1.1 inch (2.8 centimeters).

Upon the application of fluid pressure in central pipe 71, the piston 80 is displaced with respect to the valve seat 83, thus allowing the fluid to pass from the central pipe 71 towards the measuring pipe 65. The presence of the valve in the fluid path results in an increase of the pressure inside the packer 66. By way of example, the pressure increase (due to the valve only) is in the range of a fraction of psi to a few psi, e.g. from 0.2 to 2 psi (approximately 0.014 to 0.14 Kg/cm$^2$). For a given design of the tool according to the invention, the pressure increase depends upon the flow rate.

FIG. 3 is a perspective illustration of the valve piston 80 which is made of a circumferential element comprising a centered hole 89 cooperating with the rod 81. The piston 80 has a hollowed part 85 in the upstream portion of the same. In other words, the upstream part of the piston facing the flow has a concave shape. The hollowed part 85 defines a circumferential wall 86 with an edge 87 which is designed to cooperate with the valve seat 83. This particular design of the piston area facing the flow, rather than rounded or plane, is intended to reduce as much as possible the area of the piston in contact with the flow (in that case the edge 87) in order to cancel, or at least alleviate, the Venturi effect which would have resulted in a pressure force applied on the valve piston in a direction opposite to the flow, i.e. towards the valve seat, and thus preventing the flow.

FIG. 4 and FIG. 5 show another feature of the invention, providing an improved seal between the packer 66 and the borehole wall or casing. The packer bag 66 has to be substantially non extensible in the longitudinal direction so as to resist the pressure on both sides thereupon. Preferably, the bag is made of a synthetic cloth such as Nylon or polyester. The very bottom end of the packer bag (i.e. the wide end 66b) comprises holes 90 designed to cooperate with attaching means (not shown) provided on the metal blades 67. Referring to FIG. 5, in order to obtain an improved sealing between the packer bag 66 and the casing, according to the invention, there is provided on the bottom terminal part 66b of the bag 66 an inflatable annulus sealing means which might be inflated by the fluid and under the sole fluid action. In a preferred embodiment, said annulus sealing is made by securing on the packer bag 66 a circumferential cloth piece 91, preferably by sewing the respective upper and lower perimeters 94, 95 of said piece 91 to said packer. Preferably, said piece 91 is disposed on the outer side of the packer wall, i.e. on the side facing the borehole wall. The wall of the bag 66 and said piece 91 define a tubular chamber 92 which communicates with the fluid inside the packer bag 66 through apertures 93 provided on the portion of the packer bag wall disposed in regard to the piece 91. In order to allow the internal chamber 92 to expand and thus fit the form of the casing wall, the circumferential piece 91 is designed to expand radially. In one embodiment, the piece 91 is made of a cloth similar to the cloth of the packer bag 66, and is fixed on the same in a slightly folded way. In other words, the circumferential piece 91 has a diameter which is greater than the diameter of the bottom (wide) end of the packer. Thus, upon the application of fluid pressure, the fluid fills the ring-shaped chamber 92 through the apertures 93 and said chamber can expand. This feature allows the packer bag 66 to meet two opposite conditions, i.e. being resistant in the longitudinal direction and being relatively soft (at least in the terminal part designated to contact the casing wall) for fitting as much as possible the form of the casing wall.

FIG. 6 shows plots of the spinner speed (in rotation per second) versus fluid flow rate "Q" (in barrel per day; 100 barrels are sensibly equivalent to 15.9 m$^3$). All the three plots shown are constituted by straight lines corresponding each to the same spinner flowmeter 68 submitted to different conditions. Each line is e.g. a least squares line related to a set of points resulting from a given experimentation. Line 1 is the reference response of the spinner; in other words, line 1 represents the theoretical relationship between the spinner speed and flow rate, should the spinner be associated with a theoretically perfect packer providing a perfect seal (i.e. without any fluid leak) between the packer and the casing. Thus, the closer to the reference line is the line representative of an actual packer, the better is the seal between this packer and the casing. Line 2 corresponds to the response of the spinner 68 associated with a prior art type packer, such as the one described in U.S. Pat. No. 4,800,752. Line 3 corresponds to the response of the spinner associated with the packer of the present invention. FIG. 6 shows conspicuously that the packer according to the present invention (i) provides a far better seal than the prior art packers, and (ii) is very close to the reference or "no-leak" response.

What is claimed is:

1. A logging tool for carrying our measurements in a well related to the fluid therein, comprising:
 a housing, including a measuring pipe provided with measuring means;
 a packer means designed to derive the whole fluid flow into said measuring pipe; and means for increasing, through the fluid flow action, the pressure of the fluid located substantially upstream of the packer means, wherein said packer means comprises funnel means including a wide end and a narrow end, and wherein the means for increasing pressure includes obstacle means disposed in the fluid flow path, at, or downstream of, the narrow end of said packer means.

2. The tool according to claim 1 wherein said obstacle means comprises a moving element responsive to flowing fluid pressure on one side and to biasing means on the other side.

3. The tool according to claim 2 wherein said biasing means comprises a compression spring.

4. The tool according to claim 2 wherein said moving element is a valve means.

5. The tool according to claim 4 wherein said valve means includes a valve seat and a valve piston slidably mounted along a fixed longitudinal rod.

6. The tool according to claim 5 wherein said valve piston is hollowed in its portion facing said valve seat.

7. The tool according to claim 6 wherein said measuring means comprises a flowmeter.

8. A logging tool for carrying out measurements in a borehole related to the fluid therein, comprising a measuring pipe provided with measuring means, and packer means designed to derive the whole fluid flow into said measuring pipe, wherein said packer means includes a wide end designed to seal with the borehole wall, and annulus sealing means able to be inflated under the fluid action and being disposed at the wide end.

9. The tool according to claim 8 wherein said packer means includes a cone-shaped bag, and said inflatable annulus sealing means comprises two circumferential parts, facing one another, and fixed along their upper and lower perimeters so as to define a tubular chamber in communication with the fluid flow and adapted to expand radially upon the application of fluid pressure while being substantially longitudinally non-extensible.

10. The tool according to claim 9 wherein said packer means is made of a flexible but substantially longitudinally non-extensible material, such as cloth, and the annulus sealing means comprises a circumferential piece fixed on the terminal part of said bag by its upper and lower perimeters, and adapted to expand upon the application of fluid pressure substantially in the radial direction.

11. The tool according to claim 10 wherein said circumferential piece is made of a flexible but substantially longitudinally non-extensible material, and is loosely fixed on said bag for allowing radial expansion.

12. The tool according to claim 9 wherein said tubular chamber communicates with the fluid flow by apertures provided in said packer means.

13. A logging tool for carrying out measurements in a well related to the fluid flow therein, comprising a body including a measuring pipe provided with measuring means, a packer means designed to derive the whole fluid flow into said measuring pipe, further comprising means for increasing, through the fluid flow action, the pressure of the fluid located substantially upstream of said packer means, and said packer means further including, in its bottom end designed to seal with the casing wall, an annulus sealing means able to be inflated under the fluid action.

* * * * *